United States Patent
Xia (10) Patent No.: US 7,490,233 B1
(45) Date of Patent: *Feb. 10, 2009

(54) TECHNIQUES FOR ACTIVELY CONFIGURING PROGRAMMABLE CIRCUITS USING EXTERNAL MEMORY

(75) Inventor: Renxin Xia, San Jose, CA (US)

(73) Assignee: Alter Corporation, San Jose, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/370,654

(22) Filed: Mar. 7, 2006

Related U.S. Application Data (63) Continuation of application No. 10/426,163, filed on Apr. 28, 2003, now Pat. No. 7,043,630.

(51) Int. Cl.
*G06F 15/177* (2006.01)
(52) U.S. Cl. .......................................... 713/1; 713/100
(58) Field of Classification Search ........................ None
See application file for complete search history.

(56) References Cited

U.S. PATENT DOCUMENTS

| | | | | |
|---|---|---|---|---|
| 5,237,609 A | * | 8/1993 | Kimura | ....................... 713/193 |
| 5,319,598 A | * | 6/1994 | Aralis et al. | ........... 365/189.12 |
| 5,692,147 A | * | 11/1997 | Larsen et al. | ................ 711/202 |
| 5,748,979 A | * | 5/1998 | Trimberger | .................. 712/37 |
| 2002/0199110 A1 | * | 12/2002 | Kean | .......................... 713/189 |
| 2004/0128260 A1 | * | 7/2004 | Amedure et al. | .............. 705/75 |

* cited by examiner

*Primary Examiner*—Dennis M Butler
(74) *Attorney, Agent, or Firm*—Townsend and Townsend and Crew LLP

(57) ABSTRACT

Techniques for actively configuring a programmable circuit using configuration data stored in an external memory are provided. The programmable circuit attempts to read a device identification code from an external memory device using a read instruction. The programmable circuit then attempts to identify the external memory device by matching the identification code returned from the external memory with a code in a first predefined list. A match indicates that the programmable circuit has hardware that can generate instructions that the memory device can recognize. After the programmable circuit identifies the memory device, the programmable circuit sends instructions to the external memory device according to a predefined protocol understood by the memory device. The programmable circuit can also compare a device identification code for a particular memory device with a second list of identification codes to determine whether a user wants the programmable circuit to support that memory device.

16 Claims, 4 Drawing Sheets

TECHNIQUES FOR ACTIVELY CONFIGURING PROGRAMMABLE CIRCUITS USING EXTERNAL MEMORY

CLAIM OF PRIORITY

This application is a continuation of U.S. patent application Ser. No. 10/423,163, filed Apr. 28, 2003, entitled "TECHNIQUES FOR ACTIVELY CONFIGURING PROGRAMMABLE CIRCUITS USING EXTERNAL MEMORY," which is hereby incorporated herein by reference.

BACKGROUND OF THE INVENTION

The present invention relates to techniques for actively configuring programmable circuits, and more particularly, to techniques for actively configuring programmable circuits using an external memory and determining whether the external memory device is supported by a programmable integrated circuit.

Programmable integrated circuits are configured (i.e., programmed) using configuration data. Configuration data used to configure a programmable circuit can be stored in an external configuration device.

The external memory device controls the transfer of the configuration data to the programmable circuit. The configuration device has to send the data in a format that the programmable circuit can accept. The task of the programmable circuit is merely to accept the data. The programmable circuit does not contain data that identifies the configuration device. Thus, the configuration device is the master, and the programmable circuit is the slave.

However, the costs associated with a configuration device are typically high, because the configuration device must be programmable to implement the configuration data transfer functions. Therefore, it would be desirable to provide a system for transferring configuration data to a programmable circuit that reduces the cost and complexity of prior art configuration devices. Also, it would be desirable to provide a system to enable a programmable circuit to identify external configuration devices and to support only particular configuration devices, if desired.

BRIEF SUMMARY OF THE INVENTION

The present invention provides techniques for actively configuring programmable circuits using configuration data received from an external memory device. The external memory device can be from any one of a plurality of different manufacturers.

Examples of external memory devices that can store configuration data include FLASH memory, EEPROM memory, and SRAM memory. Programmable circuits of the present invention include integrated circuits such as programmable logic devices (PLDs), field programmable gate arrays (FPGAs), programmable logic arrays (PLAs), configurable logic arrays, and programmable gate arrays.

The programmable circuit attempts to read a device identification (ID) code from the external memory device using a read device ID instruction. The programmable circuit then attempts to identify the external memory device by matching the device ID code received from the external memory device with an ID code in a first predefined list.

If the device ID code from the memory device matches an ID code in the first list, the programmable circuit can issue instructions that the external memory device recognizes. The programmable circuit has instruction state machines that store instructions for different memory devices. Each instruction state machine stores instructions that are recognized by different memory devices.

After the external memory device is identified, one of the instruction state machines sends instructions to the external memory device. The instructions indicate to the external memory device, for example, when to begin and when to stop sending configuration data to the programmable circuit.

According to another embodiment of the present invention, a programmable circuit can be configured to accept configuration data only from external memory devices that are selected by a user. A second list of device ID codes is stored in the external memory device. The second list identifies one or more memory devices that a user does not want a programmable circuit to accept data from, even if the programmable circuit contains hardware that supports these memory devices.

A programmable circuit receives the second list from the external memory device. The programmable circuit then compares a device ID code for the external memory device with the second list of identification codes.

If the device ID code has a first relationship to a code in the second list, the programmable circuit accepts configuration data from that memory device. If the device ID code has a second relationship to a code in the second list, the programmable circuit does not accept configuration data from that particular memory device.

Other objects, features, and advantages of the present invention will become apparent upon consideration of the following detailed description and the accompanying drawings, in which like reference designations represent like features throughout the figures.

DETAILED DESCRIPTION OF THE INVENTION

Most memory devices (such as FLASH memory) store a device identification (ID) code (e.g., an electronic signature) that identifies the memory device. Device ID codes are usually determined by a manufacturer of the memory device. In some instances, a vendor of a memory device or other entity can change the device ID code.

A programmable circuit of the present invention actively controls the transfer of configuration data from the external memory device by issuing instructions. For example, the programmable can send a Read Instruction to the external memory device to begin the transfer of configuration data to the programmable circuit.

An external memory device can only recognize instructions that conform to one instruction set protocol. The memory device ID code identifies an instruction set protocol that the memory device recognizes. The programmable circuit can identify the instruction set protocol for a particular memory device by reading the device ID code.

Memory devices typically recognize a dedicated instruction that is used to read the device ID code from the memory device. In order to identify the instruction set protocol of a memory device, a programmable circuit reads the device ID code from the memory device using the dedicated read device ID instruction. The programmable circuit then compares the device ID code with a known list of ID codes.

Figure 1A:
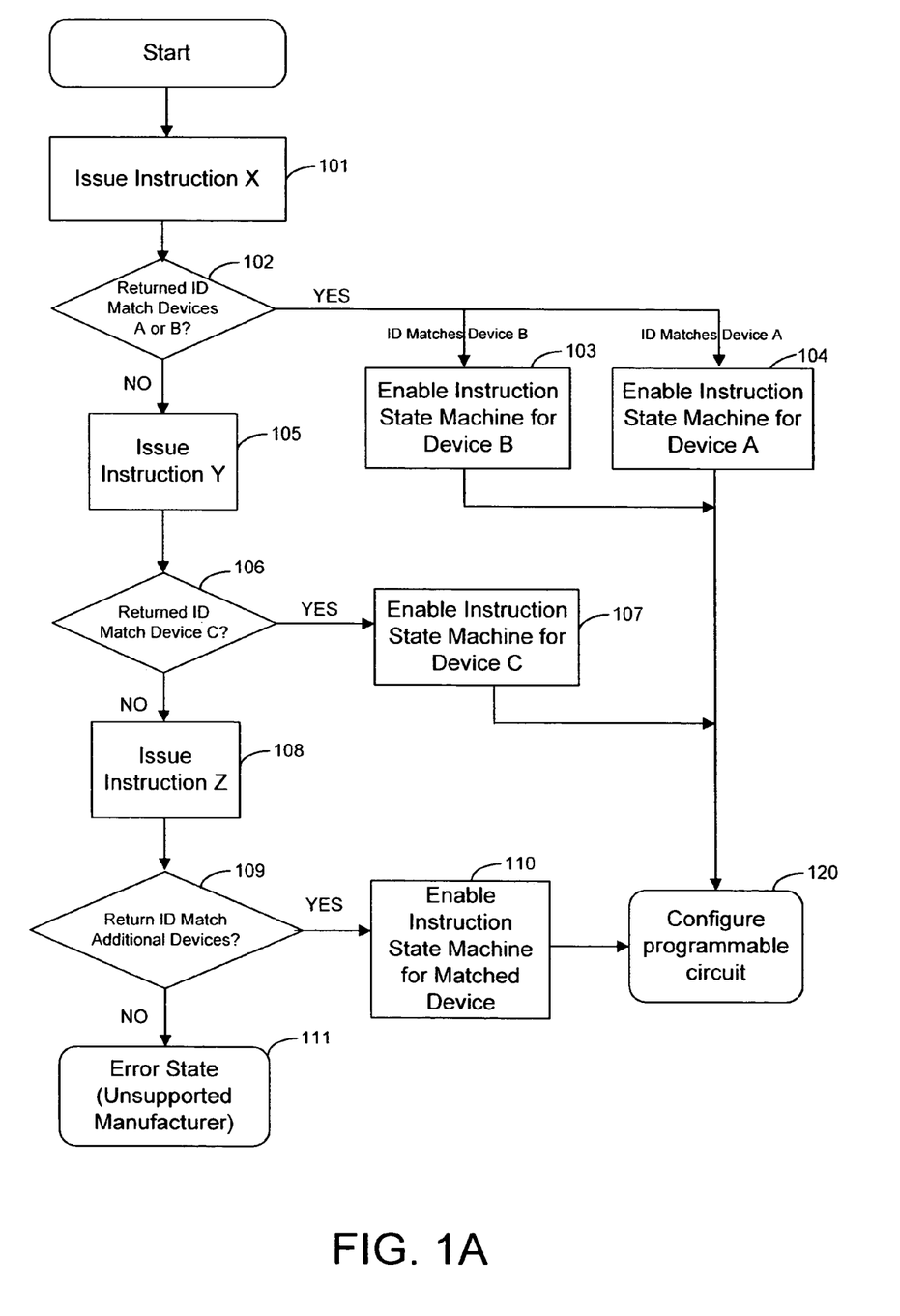
FIG. 1A is a flow chart that illustrates how a programmable circuit can determine whether it supports instructions for a particular external memory device according to an embodiment of the present invention.

If the external memory device does not recognize the read device ID instruction, the programmable circuit attempts different read device ID instructions sequentially in a non-conflicting order. FIG. 1A illustrates a process for how a programmable circuit can send a plurality of dedicated read device ID instructions to identify an external memory device that stores configuration data.

According to the embodiment illustrated in FIG. 1A, a programmable circuit of the present invention stores three read device ID instructions X, Y, and Z. The programmable circuit issues these read device ID instructions to an external memory device in sequential order.

Programmable circuits of the present invention can store any suitable number of device ID instructions. FIG. 1A illustrates three read device ID instructions merely as an example and is not intended to limit the scope of the present invention.

Figure 2:
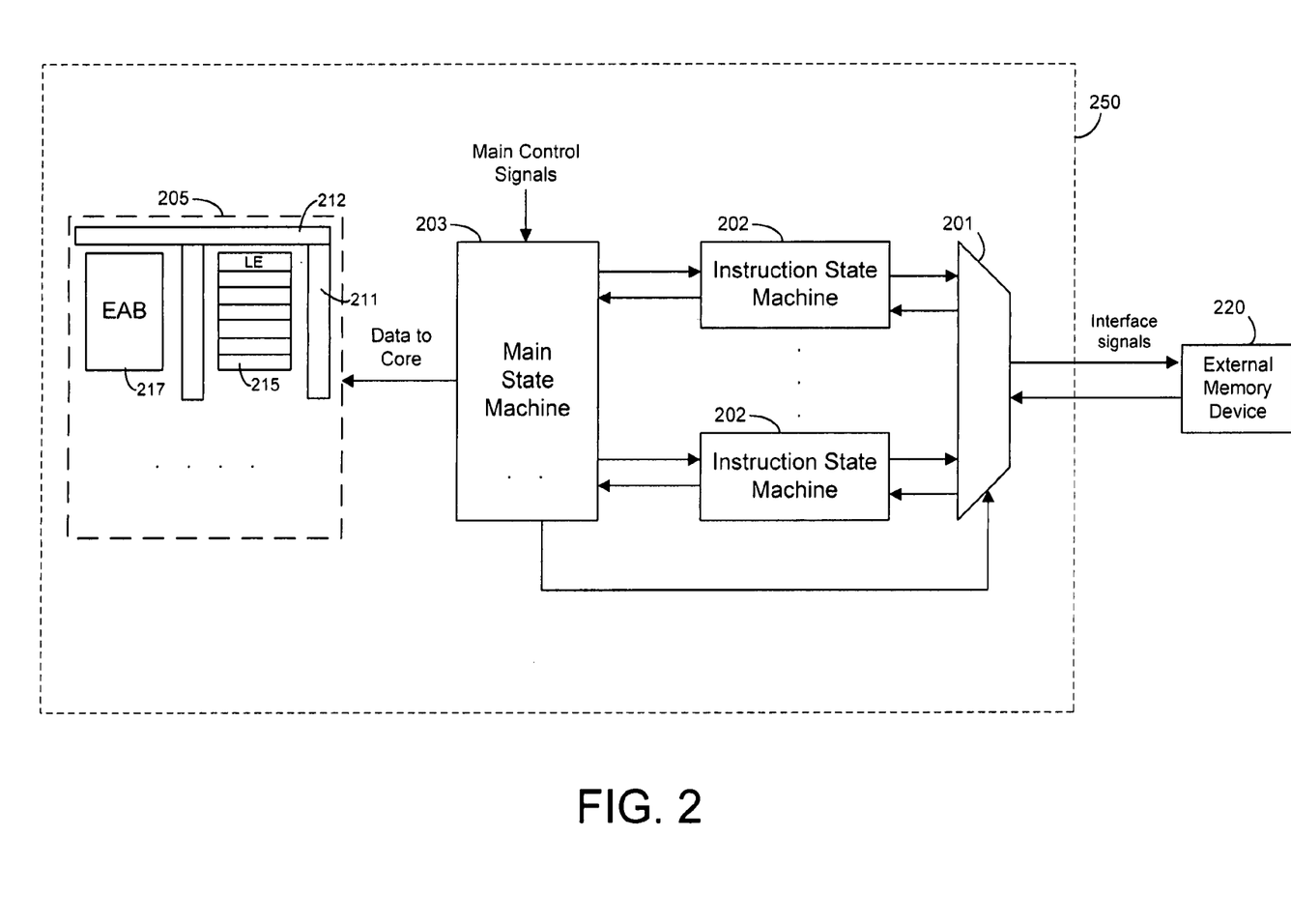
FIG. 2 illustrates a system in a programmable circuit that controls how instructions from different protocols are sent to an external memory device and how configuration data is received by the programmable circuit from the external memory according to an embodiment of the present invention.

FIG. 2 illustrates an embodiment of circuitry that can implement the techniques of the present invention. Circuitry 250 shown in FIG. 2 is part of a programmable integrated circuit. Circuitry 250 includes a main state machine 203, a plurality of instruction state machines 202, a multiplexer 201, and programmable logic circuitry 205. Circuitry 250 receives configuration data from external memory device 220.

A user can initiate the configuration or reconfiguration of the programmable circuit by using the main control signals to activate main state machine 203. The present invention employs active techniques for configuring a programmable circuit, because main state machine 203 controls the general sequencing in the configuration process (as opposed to the external memory device controlling the configuration process).

Circuitry 250 includes multiple instruction state machines 202. Each state machine 202 issues instructions that one or more memory devices can recognize.

Memory devices made by the same manufacturer may recognize the same set of instructions. For example, a certain manufacturer can have many memory devices of different densities that may (or may not) use the same set of instructions. Each memory device has a different device ID code. Sometimes device ID codes are broken up into two parts. One part of the device ID code identifies the manufacturer, and the second part identifies the particular memory device.

For example, main state machine 203 issues instruction that are designed to control the reading and transfer of configuration data from external memory device 220 to core 205 of the programmable circuit. Main state machine 203 issues instructions such as "Initialize," "Read," or "Finish Read" that are not specific to the protocol of a particular memory device. These instructions are sent to instruction state machines 202.

Each of instruction state machines 202 can implement a general instruction from state machine 203 by generating an instruction that a particular memory device can recognize. Thus, instruction state machines 202 convert generalized instructions from main state machine 203 into instructions that particular memory devices can recognize. The instructions generated by one instruction state machine 202 are sent to the external memory device through multiplexer 201.

Each instruction state machine 202 can issue a set of instructions that are recognized by one or more memory devices. For example, one instruction state machine 202 can issue instructions that memory devices from a particular manufacturer recognize. Additional instruction state machines 202 can be added to the programmable circuit (or removed from the programmable circuit) without effecting the other state machines 202.

Main state machine 203 controls instruction state machines 202. Main state machine 203 selects one instruction state machine 202 to actively send instructions to the external memory device. The set of instructions stored in each one of instruction state machines 202 includes a read device ID instruction that reads the device ID code from the external memory device.

Referring again to FIG. 1A, the programmable circuit issues a read device ID instruction X to the external memory device in step 101. Specifically, main state machine 203 sends a generalized read device ID instruction to a first one of instruction state machines 202. In response to the generalized read instruction, the first instruction state machine 202 generates a specific read device ID instruction (instruction X). Instruction X is selected from a set of instructions that one or more memory devices can recognize.

Main state machine 203 also controls a select input of multiplexer 201 as shown in FIG. 2. Multiplexer 201 passes output signals from the first state machine 202 to the external memory device in response to a signal from main state machine 203.

Multiplexer 201 can pass signals in two directions. Multiplexer 201 can receive signals from the external memory device and transfer these signals to instruction state machines 202 and main state machine 203. For example, multiplexer 201 receives a device ID code from the external memory device and passes the ID code to an instruction state machine 202, which transfers the ID code to state machine 203.

The external memory device returns a device ID code to the programmable circuit if the memory device recognizes instruction X. At decisional step 102, main state machine 203 determines whether a device ID code received from the external memory device matches an ID code for memory device A or B in a known list of ID codes.

If the ID code returned from the memory device matches a known ID code for memory device B, main state machine 203 enables the first instruction state machine 202 at step 103. First instruction state machine 202 issues instructions that memory device B recognizes.

If the returned ID code matches a known code for memory device A, main state machine 203 enables a second one of instruction state machines 202 at step 104. Second instruction state machine 202 issues instructions that memory device B recognizes.

In the exemplary embodiment of FIG. 1A, memory devices A and B recognize the same read device ID instruction X. Therefore, a single read device ID instruction X causes a device from memory device A or B to return its device ID code to the programmable circuit. However, memory devices A and B have different device ID codes. Main state machine 203 compares the returned device ID code to a predefined list of ID codes to identify the individual memory device.

The programmable circuit has a different instruction state machine 202 for memory device A than for memory device B. Different state machines 202 are used, because memory devices A and B recognize different instructions (besides the read device ID instruction).

Once the instruction state machine 202 that corresponds to the identified memory device has been enabled, the enabled state machine 202 sends instructions to the external memory device. For example, the enabled state machine 202 can send one or more instructions to memory device 220 that cause configuration data in the memory device to be transferred back to the programmable circuit. The enabled state machine 202 issues device-specific instructions in response to general instructions from main state machine 203.

Main state machine 203 receives the configuration data from the enabled instruction state machine 202. Main state machine 203 regulates the transfer of configuration data to the core 205 of the programmable circuit. Programmable circuit elements in the programmable integrated circuit are configured at step 120.

A programmable integrated circuit can include numerous well-known architectures. For example, a programmable circuit can include a number of programmable logic elements (LEs) 215 that can be programmed to implement general logic functions. LEs 215 can include look-up tables and registers. Programmable circuits typically include routing resources such as column and row interconnect 211 and 212. Programmable circuits can also include a number of embedded array blocks (EABs) 217 that implement memory and specialized logic functions.

A programmable integrated circuit can include numerous types of programmable blocks and routing resources other than the ones shown in core 205. The blocks and routing resources in core 205 are merely examples of programmable circuit elements that are not intended to limit the scope of the present invention.

The enabled state machine 202 can also send an instruction to the external memory device that causes the external memory device to stop reading data. As discussed above, the instructions sent to the memory device match a protocol that the memory device can recognize and respond to.

If the external memory device does not return a device ID code, the process continues to step 105 in FIG. 1A. In step 105, the programmable circuit issues read device ID instruction Y to external memory device 220. Specifically, main state machine 203 send a general read device ID instruction to a third one of instruction state machines 202. The general read instruction causes the third instruction state machine 202 to generate a device-specific read device ID instruction (instruction Y). The device-specific read device ID instruction is selected from a set of instructions that one or more memory devices can recognize.

If the external memory device recognizes instruction Y, the external memory device returns a device ID code to the programmable circuit. At decisional step 106, main state machine 203 determines whether the device ID code received from memory device 220 matches an ID code for memory device C in the predefined list of ID codes.

If the returned device ID code matches a known code for memory device C, main state machine 203 enables the third instruction state machine 202 at step 107. The third instruction state machine 202 sends instructions to memory device 220 that memory device C according can recognize. The programmable circuit is then configured at step 120.

At step 108, main state machine 203 causes a fourth instruction state machine 202 to issue read device ID instruction Z. Read device ID instruction Z is recognized by one or more additional memory devices. If memory device 220 returns a device ID code in response to instruction Z, main state machine 203 compares the returned ID code to the predefined list of ID codes at decisional step 109.

If the returned device ID code matches a code in the list, main state machine 203 enables the instruction state machine 202 that issues instructions for the matched memory device(s) at step 110. The programmable circuit is then configured at step 120.

The programmable circuit continues to issue read device ID instructions until it recognizes one of the device ID codes received from external memory device 220. When main state machine 203 recognizes one the returned device ID codes, a corresponding instruction state machine 202 is enabled. The enabled state machine 202 can generate instructions according to a protocol that the identified memory device(s) recognize.

Thus, the programmable circuit continues to repeat steps such as steps 108-110 until it runs out of read memory ID instructions. After the programmable circuit has sent all of its stored read memory ID instructions to the external memory device without successfully identifying the memory device, the programmable circuit enters an error state at step 111. The error state indicates that the external memory device is not supported by that particular programmable circuit.

According to the principles of the present invention, the programmable circuit is the master device that controls the reading of configuration data from the external memory device. The external memory is the passive, slave device. Main state machine 203 is the main processing unit that controls the reading of configuration data from the external memory and the transfer of configuration data to the core of the programmable circuit.

By having the ability to support multiple external memory devices from more than one manufacturer, exposure to one manufacturer's memory devices is reduced. A programmable circuit that can read memory devices from multiple manufacturers is more flexible and more desirable to customers who may not want to use external memory devices from a particular manufacturer.

According to another embodiment of the present invention, a programmable circuit can compare a device ID code to a second list of device ID codes in order to selectively support particular external memory devices. As discussed above, state machines 202 correspond to hardwired circuitry that supports a set of external memory devices. After a PLD has been manufactured, a user can prevent a PLD from accepting data from one or more memory devices that state machines 202 support, according to this embodiment. Further details of this embodiment are now discussed.

Figure 1B:
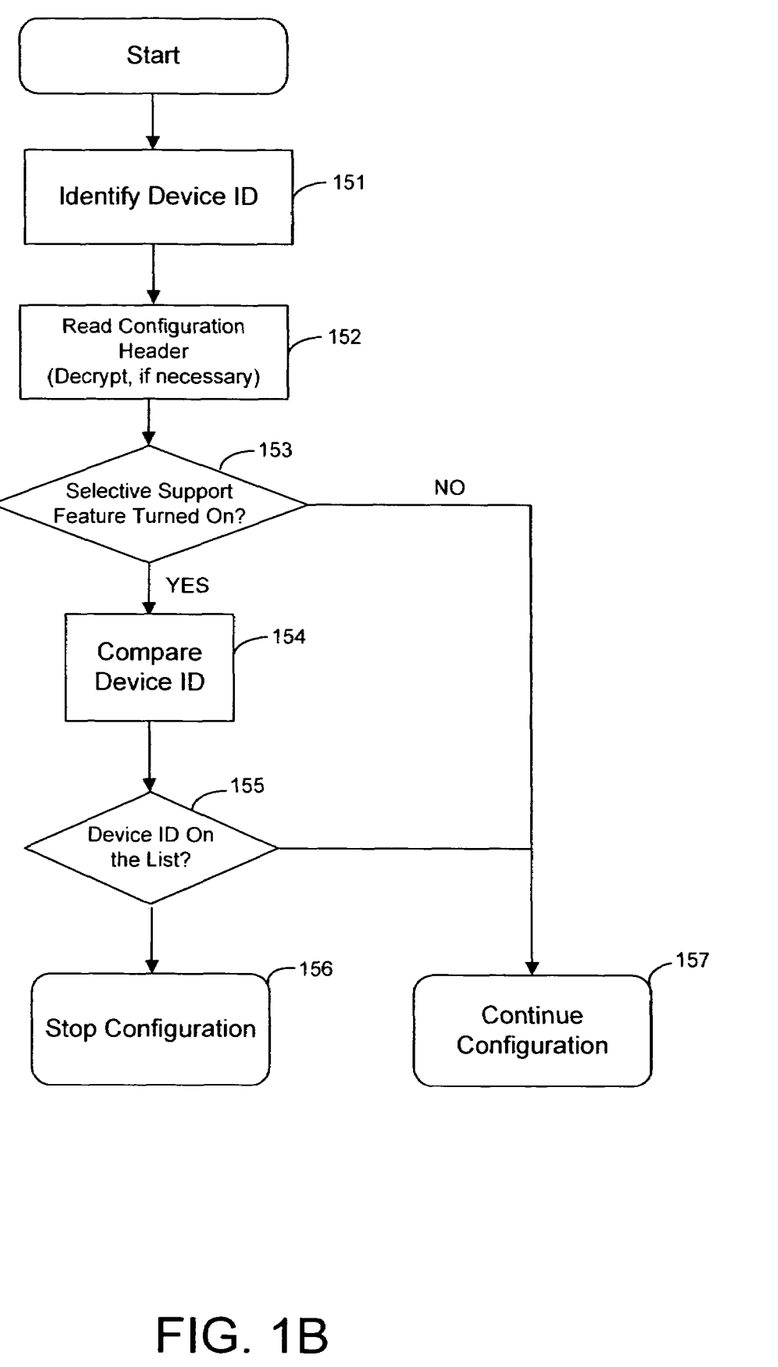
FIG. 1B is a flow chart that illustrates a process for how a programmable circuit selectively supports external memory devices according to another embodiment of the present invention.

FIG. 1B illustrates a process according to this embodiment of the present invention. At step 151, a programmable circuit reads a device ID code from an external memory device that stores configuration data using a dedicated read device ID instruction. If the device ID matches a device ID on a first predefined list, the programmable circuit includes hardware (state machines 202) that can issue instructions according to the protocol the memory device recognizes as discussed above.

A user can store configuration data for a programmable circuit in an external memory device. According to an embodiment of the present invention, the user also stores a header in the external memory device along with the configuration data. The header includes bits that occur before the configuration data in a data stream.

The header includes a second list of memory device ID codes. As an example, the memory device ID codes in the header identify memory devices that a user wants the programmable circuit to support. A user can prevent a programmable circuit from accepting configuration data from particular memory devices by not including ID codes for those memory devices in the header.

As discussed above with respect to FIG. 2, state machines 202 store instructions that can be recognized by particular memory devices. If desired, less than all of the device ID codes for these memory devices can be included in the header. Thus, a user can prevent a programmable circuit from accepting configuration data from a memory device that recognizes instructions from one of state machines 202.

For example, a programmable integrated circuit can be manufactured with state machines 202 that contain instructions for memory devices A, B, C, and D. However, a user may decide that he or she does not want the programmable circuit to receive configuration data from memory devices B and D for business reasons, even though the programmable circuit contains hardware that supports memory devices B and D. The user decides that the programmable circuit will only receive configuration data from memory devices A and C.

The user places the device ID codes for memory devices A and C in the header of the configuration data. The header and the configuration data are stored in the memory device. The programmable circuit only accepts configuration data from memory devices A and C when it reads the header.

Alternatively, the user can place device ID codes for memory devices B and D in the header of the configuration data, and in response to reading the header, the programmable circuit only accepts configuration data from memory devices A and C.

Referring again to FIG. 1B, the programmable circuit reads the configuration header at step 152. The configuration header includes the list of device ID codes that the user has stored in the external memory device. If the header and the configuration data are encrypted, the programmable circuit also decrypts the data at step 152.

At decisional step 153, the programmable circuit determines whether the selective support feature is turned ON or OFF. The selective support feature refers to the list of device ID codes stored in the header of the configuration data.

When the selective support feature is OFF, the programmable circuit does not check the device ID code list in the header of the configuration data. The programmable circuit accepts configuration data from all memory devices that are supported by state machines 202. If the selective support feature is OFF, the programmable circuit continues to receive configuration data at step 157. The configuration data is used to program circuit elements in the programmable circuit.

When the selective support feature is ON, the programmable circuit determines if the ID code for device 220 is stored in the header of the configuration data. According to one embodiment, the selective support feature can be turned ON and OFF by setting a bit in the header to a 1 or a 0.

If the selective support feature is ON, the programmable circuit proceeds to step 154. At step 154, the programmable circuit compares the device ID code for device 220 to the device ID codes stored in the header.

At decisional step 155, the programmable circuit determines whether the device ID code for device 220 is on the list in the header of the configuration data. If the device ID code identified at step 151 is not in the list, the programmable circuit stops receiving the configuration data stream at step 156, and the configuration data is not used to program the programmable circuit.

If the device ID code for device 220 is on the list in the header, the programmable circuit continues to receive the configuration data at step 157. The configuration data is then used to program the programmable circuit. According to one embodiment of the present invention, circuitry in main state machine 203 performs some or all of steps 151-157.

According to another embodiment of the present invention, the list of device ID codes stored in the header includes ID codes for external memory devices that the user does not want the programmable circuit to receive configuration data from. As discussed above, the programmable circuit compares the device ID code for device 220 with ID codes stored in the header at step 154.

If the device ID code for device 220 matches an ID code in the list at step 155, the programmable circuit stops receiving configuration data at step 156. If the device ID code for device 220 does not match one of the ID codes in the list, the programmable circuit continues to receive configuration data from device 220 at step 157. The programmable circuit only proceeds to step 157, if one of state machines 202 stores instructions that device 220 can recognize, as discussed above.

Thus, the ID codes in the header can represent any desired relationship to the memory devices that a user wants a PLD to support. The ID codes in the header can identify memory devices that the user wants the PLD to support or memory devices that the user does not want to the PLD to support.

Main state machine 203 receives the configuration data from the enabled instruction state machine 202. Main state machine 203 regulates the transfer of configuration data to the core 205 of the programmable circuit.

A programmable integrated circuit can include numerous types of programmable blocks and routing resources other than the ones shown in core 205. The blocks and routing resources in core 205 are merely examples of programmable circuit elements that are not intended to limit the scope of the present invention.

Figure 3:
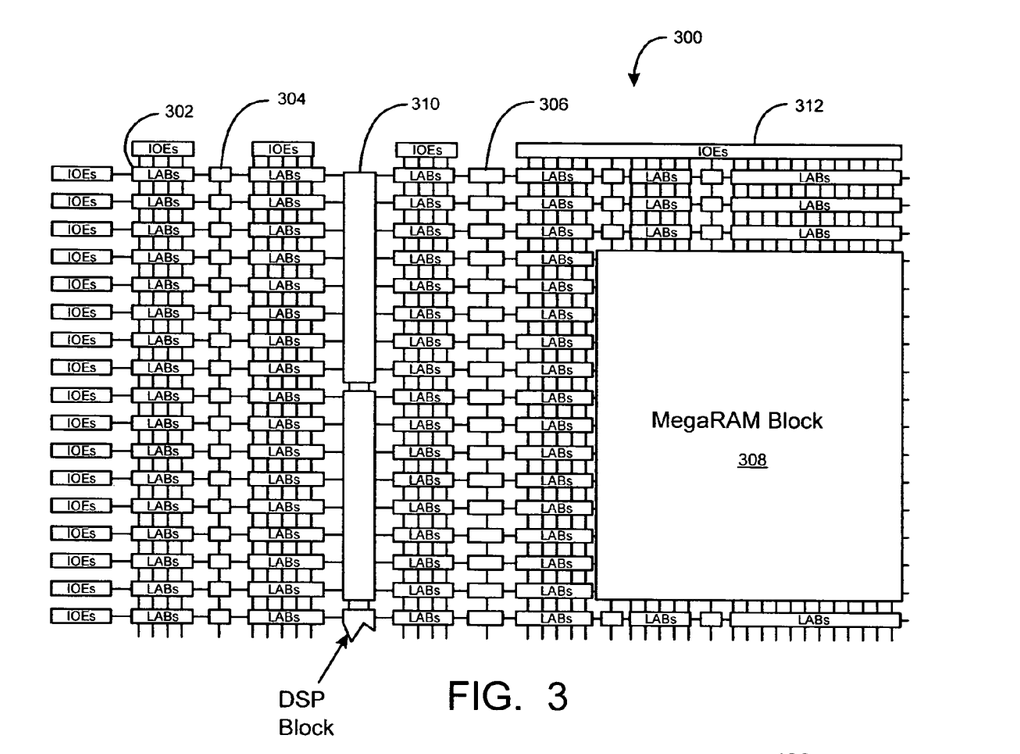
FIG. 3 is a simplified block diagram of a programmable logic device that can implement embodiments of the present invention.

FIG. 3 is a simplified partial block diagram of an exemplary high-density PLD 300 wherein techniques according to the present invention can be utilized. PLD 300 includes a two-dimensional array of programmable logic array blocks (or LABs) 302 that are interconnected by a network of column and row interconnects of varying length and speed. LABs 302 include multiple (e.g., 10) logic elements (or LEs), an LE being a small unit of logic that provides for efficient implementation of user defined logic functions.

PLD 300 also includes a distributed memory structure including RAM blocks of varying sizes provided throughout the array. The RAM blocks include, for example, 512 bit blocks 304, 4K blocks 306 and a MegaBlock 308 providing 512K bits of RAM. These memory blocks may also include shift registers and FIFO buffers. PLD 300 further includes digital signal processing (DSP) blocks 310 that can implement, for example, multipliers with add or subtract features. I/O elements (IOEs) 312 located, in this example, around the periphery of the device support numerous single-ended and differential I/O standards. It is to be understood that PLD 300 is described herein for illustrative purposes only and that the present invention can be implemented in many different types of PLDs, FPGAs, and the like.

Figure 4:
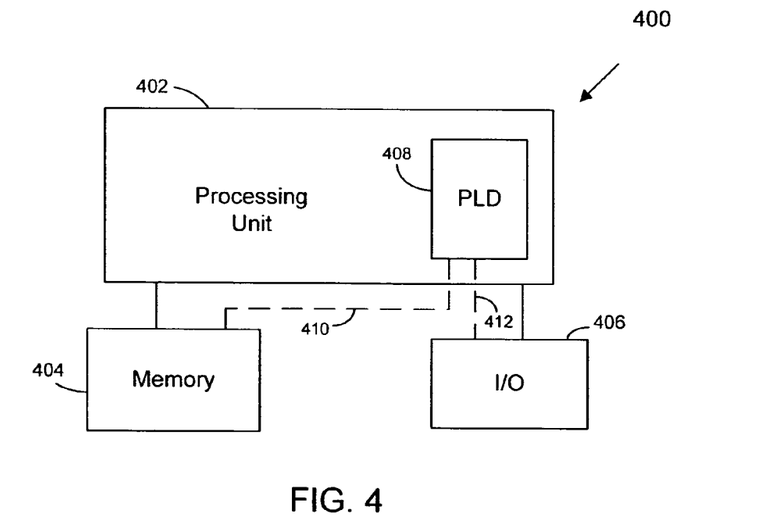
FIG. 4 is a block diagram of an electronic system that can implement embodiments of the present invention.

While PLDs of the type shown in FIG. 3 provide many of the resources required to implement system level solutions, the present invention can also benefit systems wherein a PLD is one of several components. FIG. 4 shows a block diagram of an exemplary digital system 400, within which the present invention may be embodied. System 400 may be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 400 may be provided on a single board, on multiple boards, or within multiple enclosures.

System 400 includes a processing unit 402, a memory unit 404 and an I/O unit 406 interconnected together by one or more buses. According to this exemplary embodiment, a programmable logic device (PLD) 408 is embedded in processing unit 402. PLD 408 may serve many different purposes within the system in FIG. 4. PLD 408 may, for example, be a logical building block of processing unit 402, supporting its internal and external operations. PLD 408 is programmed to implement the logical functions necessary to carry on its particular role in system operation. PLD 408 may be specially coupled to memory 404 through connection 410 and to I/O unit 406 through connection 412.

Processing unit 402 may direct data to an appropriate system component for processing or storage, execute a program stored in memory 404 or receive and transmit data via I/O unit 406, or other similar function. Processing unit 402 may be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU. For example, instead of a CPU, one or more PLDs 408 may control the logical operations of the system. In an embodiment, PLD 408 acts as a reconfigurable processor, which can be reprogrammed as needed to handle a particular computing task. Alternately, programmable logic device 408 may itself include an embedded microprocessor. Memory unit 404 may be a random access memory (RAM), read only memory (ROM), fixed or flexible disk media, PC Card flash disk memory, tape, or any other storage means, or any combination of these storage means.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiment disclosed, but that the invention will include all embodiments and equivalents falling within the scope of the claims.

What is claimed is:

1. A programmable circuit operable to receive configuration data, the programmable circuit comprising:
    a main state machine operable to issue general instructions to control transfer of configuration data from an external memory device; and
    a plurality of instruction state machines coupled to the main state machine, each of the instruction state machines configured to provide memory device-specific instructions for one or more memory devices in response to the general instructions issued from the main state machine.

2. The programmable circuit according to claim 1, wherein:
    the main state machine causes a first instruction state machine of the plurality of instruction state machines to send a read device identification instruction to the external memory device, and
    the main state machine enables the first instruction state machine if an identification code returned from the external memory device matches an identification code in a list of identification codes accessible to the main state machine.

3. The programmable circuit according to claim 1, wherein:
    the main state machine causes a first instruction state machine of the plurality of instruction state machines to send a read device ID instruction to the external memory device, and
    the main state machine enables a second instruction state machine if an identification code returned from the external memory device matches an identification code in a list of identification codes accessible to the main state machine, wherein the matched identification code in the list corresponds to the second instruction state machine.

4. The programmable circuit according to claim 1, wherein:
    the main state machine attempts to match an identification code received from the external memory device with identification codes in a predefined list in order to identify a the external memory device; and
    the main state machine enters an error state if the identification code from the external memory device does not match any of the identification codes in the predefined list.

5. A method for retrieving configuration data for a programmable circuit, comprising the steps of:
    providing non-device specific instructions that control reading of the configuration data from an external memory device;
    providing a plurality of memory device-specific instructions in response to the non-device specific instructions; and
    selecting the one of the plurality of memory device specific instructions and providing the selected memory device specific instructions to the external memory device.

6. The method of claim 5, further comprising:
    providing a read device identification instruction to the external memory device;
    receiving a device identification code from the external memory device in response to the read device identification instruction; and
    comparing the device identification code from the external memory to a predefined list of codes to identify the external memory device.

7. The method of claim 6, further comprising:
    providing instructions that the first memory device recognizes in response to the non-device specific instructions where the device identification code matches a code of a first memory device.

8. The method of claim 7, further comprising:
    receiving the configuration data from the external memory device at the programmable circuit; and
    providing the configuration data to a core of the programmable circuit.

9. A computer program product embedded in a computer readable medium, the computer program product comprising:

computer program code for generating first instructions for reading configuration data from an external memory device;

computer program code for comparing a device identification code received from the external memory device with a predefined list of codes to identify the external memory device; and computer program code for generating second instructions for reading the configuration data from the external memory device in response to the first instructions, wherein the second instructions are specific to a first memory device.

10. The computer program product of claim 9, further comprising:

computer program code for receiving configuration data from the external memory device and sending the received configuration data to an integrated circuit.

11. The computer program product of claim 9, further comprising:

computer program code for generating a sequence of read instructions that instruct the external memory device to output the device identification code, wherein the read instructions are specific to protocols of different memory devices.

12. A method in an integrated circuit for accepting configuration data from an external memory device, comprising the steps of:

receiving an identification code from the external memory device to the integrated circuit, the identification code identifying the external memory device;

comparing the identification code to a local list of identification codes; and determining whether to use configuration data from the external memory based on whether the identification code appears in the local list of identification codes.

13. The method according to claim 12, wherein:

the configuration data is used when the identification code appears in the local list of identification codes.

14. A programmable integrated circuit, comprising:

a main state machine operable to determine whether a device identification (ID) code received from an external memory device is in a first list of device ID codes, the main state machine further operable to determine whether the device ID code is in a second list of ID codes, the device ID code being in the second list determining whether configuration data is to be received from the external memory device and used to configure programmable circuit elements.

15. The programmable integrated circuit according to claim 14, further comprising:

a plurality of instruction state machines each operable to send a read device ID instruction to the external memory device to retrieve the device ID code that identifies the external memory device, the main state machine being further operable to enable a selected instruction state machine to send additional instructions to the external memory device where the main state machine determines that the device ID code matches a code that corresponds to the selected instruction state machine.

16. The programmable integrated circuit according to claim 14, wherein:

the main state machine is further operable to analyze at least one bit received from the external memory device, and if the bit is set to a first predetermined value, the programmable circuit is operable to use the configuration data to configure the programmable circuit elements, even if the device ID code identifying the external memory device does not have the first relationship to the list.

* * * * *

UNITED STATES PATENT AND TRADEMARK OFFICE
CERTIFICATE OF CORRECTION

PATENT NO. : 7,490,233 B1
APPLICATION NO. : 11/370654
DATED : February 10, 2009
INVENTOR(S) : Renxin Xia Page 1 of 1

It is certified that error appears in the above-identified patent and that said Letters Patent is hereby corrected as shown below:

On the title page, item (73) Assignee:

Delete "Alter" and replace it with --Altera-- so that (73) Assignee reads Altera Corporation Signed and Sealed this Sixteenth Day of June, 2009

JOHN DOLL
*Acting Director of the United States Patent and Trademark Office*